UNITED STATES PATENT OFFICE 2,391,331

STABILIZATION OF SULPHOLANES

Rupert C. Morris, Berkeley, and Alva V. Snider, Richmond, Calif., assignors to Shell Development Company, San Francisco, Calif., a corporation of Delaware No Drawing. Application August 30, 1944, Serial No. 552,014

20 Claims. (Cl. 260—329)

This invention relates to a method for preventing or inhibiting the decomposition of sulpholanes. The invention pertains further to the stabilized sulpholane compositions resulting from the application of such method.

The sulpholanes, i. e. the cyclotetramethylene sulphones are, in general, water-white in color when freshly prepared or freshly distilled at subatmospheric pressures. Some sulpholanes, e. g. sulpholane itself, remain water-white when stored over long periods of time. However, many sulpholanes darken upon standing, upon heating, or upon distillation at atmospheric pressure. This is particularly true of many of the alkyl substituted sulpholanes. The darkening which takes place upon standing occurs regardless of the type of container used for storage. It occurs in glass vessels as well as in steel drums. This tendency to develop a dark color may probably be ascribed to the formation of dark-colored sulphur-containing bodies in the nature of sulphur-containing polymers formed by the decomposition of the sulphone and subsequent polymerization of the decomposition products. The presence of these dark-colored compounds in the finished sulpholane product is undesirable since it renders them unsuited for uses to which they might otherwise be applied. The problem is particularly acute in the case of 2,4-dimethylsulpholane (2,4-dimethylcyclotetramethylene sulphone):

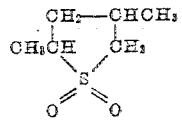

This useful compound may be readily prepared in a water-white condition. Upon heating or storing it, however, it becomes discolored and is thereby rendered unfit for use in many of its commercial applications.

It has been found that the formation of the sulphur-containing colored substances, the presence of which is responsible for the darkening of the sulpholanes, may be inhibited and the sulpholane product kept in a substantially water-white form by the incorporation into the freshly prepared and water-white sulpholane product of a suitable quantity of an inhibitor comprising a suitable basic nitrogen-containing compound. The addition of such a basic nitrogen-containing inhibiting substance effectively prevents the darkening of the sulpholane sample to which it has been added. If it is added to a sample of a sulpholane which has already turned dark in color, it causes the darkened sample to become lighter in color and to remain light in color, even though stored for long periods of time.

Suitable basic nitrogen-containing compounds for use as inhibitors for the sulpholanes comprise, in general, those compounds having the general formula $R_3N$, wherein R represents a hydrogen atom or a hydrocarbon radical. Suitable stabilizing substances include, therefore, ammonia and the aliphatic, cycloaliphatic, aromatic and mixed aliphatic-aromatic primary, secondary and tertiary amines. The amines may contain other functional groups in addition to the amino group provided that such functional groups are of an inert character, i. e. are of such a nature as to be substantially non-reactive toward the sulpholanes to which they are to be added. Suitable non-interfering substituent groups are, for example, the hydroxyl group, the ether group, an olefinic linkage, a second amino group, a sulphone group, etc.

The particular basic nitrogen-containing compound to be used for stabilizing a given sulpholane depends upon the character of the sulpholane to be stabilized and upon the use to which the said sulpholane is to be put. If it is desired to stabilize the sulpholane for storage periods of many months, a relatively permanent stabilizing agent such as a relatively high-boiling amine may be added thereto. However, if it is desired to stabilize the sulpholane for a relatively short period of time and to use a stabilizing agent which may be readily removed before use of the sulpholane, a relatively volatile and low-boiling basic nitrogen compound such as ammonia or a low-boiling amine may be employed. In most cases, however, it is preferred to permanently stabilize the sulpholane by the addition of a basic nitrogen compound which has substantially the same boiling range as does the sulpholane itself. This results in the formation of a stabilized composition which may be safely stored without loss of stabilizer for long periods of time, i. e. periods of many months. The stabilized composition may also be put to many uses without danger of loss of the stabilizing agent since the stabilized composition may be distilled or otherwise handled without effecting the separation of the stabilizing agent from the sulpholane.

A preferred group of basic nitrogen-containing compounds to be used for stabilizing the herein described sulpholanes comprise the primary, secondary and tertiary aliphatic amines which have a boiling range which is approximately the same as the boiling range of the sulpholanes to which they are to be added. This preferred group includes in general those amines having from 8 to 18 carbon atoms, e. g. octylamine, nonylamine, decylamine, undecylamine, dodecylamine, tridecylamine, tetradecylamine, pentadecylamine, hexadecylamine, octadecylamine, diamylamine, amylhexylamine, amylheptylamine, amyloctylamine, amylnonylamine, amyldecylamine, amyldodecylamine, dihexylamine, hexylheptylamine, hexyloctylamine, hexylnonylamine, hexyldecylamine, hexyldodecylamine, diheptylamine, heptyloctylamine, heptylnonylamine, heptyldecylamine, heptylundecylamine, dioctylamine, octylnonylamine, octyldecylamine, dinonylamine, tripropylamine, tributylamine, triamylamine, trihexylamine, dimethylhexylamine, dimethylheptylamine, dimethyloctylamine, dimethyldecylamine, dimethyldodecylamine, methylethyloctylamine, methylpropyldecylamine, diethylhexylamine, diethyloctylamine, diethyldecylamine, ethylbutylhexylamine, ethylhexyloctylamine, dipropyloctylamine, propylbutylhexylamine, diamylhexylamine, butylamylhexylamine, amylhexylheptylamine, and amylheptyloctylamine. These compounds may be used singly or in admixture with each other or with inert substances such as solvents or diluent materials. Triamylamine is a preferred member of this group since it has desirable physical properties and is particularly effective in establishing and maintaining colorless solutions of sulpholanes, particularly 2,4-dimethylsulpholane.

Sulpholanes (cyclotetramethylene sulphones) which may be successfully stabilized by the addition of effective amounts of the hereinabove described basic nitrogen-containing compounds comprise the alkyl-substituted sulpholanes, particularly the methyl substituted sulpholanes. Alkyl-substituted sulpholanes which may be thus stabilized include 2-methyl sulpholane, 3-methyl sulpholane, 2,3-dimethyl sulpholane, 2,4-dimethyl sulpholane, 2,5-dimethyl sulpholane, 2,3,4-trimethyl sulpholane, 2,3,5-trimethyl sulpholane, 2,3,4,5-tetramethyl sulpholane, 2-ethyl sulpholane, 3-ethyl sulpholane, 2,3-diethyl sulpholane, 2,4-diethyl sulpholane, 2,5-diethyl sulpholane, 2,3,4-triethyl sulpholane, 2,3,5-triethyl sulpholane, 2,3,4,5-tetraethyl sulpholane, 2-methyl-3-ethyl sulpholane, 3-methyl-4-ethyl sulpholane, 2-methyl-4-ethyl sulpholane, 2-methyl-5-ethyl sulpholane, 2-ethyl-3-methyl sulpholane, 2-ethyl-4-methyl sulpholane, 2-methyl-3-ethyl-4-propyl sulpholane, 2,3-diethyl-4-propyl sulpholane, 2,3-dimethyl-4-propyl sulpholane, 2,3,4-tripropyl sulpholane, 2-butyl sulpholane, 3-butyl sulpholane, 2-methyl-3-butyl sulpholane, 2-ethyl-4-butyl sulpholane, and their homologues. Individual sulphones may be stabilized by adding a basic nitrogen-containing compound as described herein, or mixtures of sulpholanes or mixtures of sulpholanes with other substances such as solvents may be thus stabilized.

The stabilizing substance may be added to the sulpholane at any desired time or in any suitable manner. It is usually preferred to add the inhibitor to the freshly prepared water-white material. It may be added equally effectively, however, to a quantity of sulpholane which has darkened after storage and has been distilled under reduced pressure to form a water-white product. The stabilizer may also be added to a quantity of product which is dark in color. In this case the addition of the stabilizer results in a remarkable fading out of the dark color and the formation of an almost water-white or a light yellow product, which will remain without further darkening for long periods of storage or during chemical processing.

The amount of stabilizing substance which may be most effectively added to the sulpholane is variable depending upon many factors such as the particular sulpholane to be stabilized, the stabilizer used, the subsequent treatment to which the stabilized mixture is to be subjected, the storage time, etc. In general, a sufficient amount of stabilizer should be added to maintain a water-white product or to result in the maximum bleaching of a colored product. In most instances an amount of between about 0.001% and about 5.0% by weight based on the amount of sulpholane which is to be stabilized is a satisfactory amount. When stabilizing 2,4-dimethylsulpholane with triamylamine about 0.1% of triamylamine is an effective and preferred amount. The basic nitrogen-containing stabilizers may be added to the sulpholanyl compound in any desired fashion. When the stabilizing agent used is ammonia, the ammonia may be preferably added directly to the sulpholanyl compound in the form of anhydrous ammonia, e. g. ammonia gas, or liquid ammonia. The preferred stabilizing agents, i. e. the aliphatic amines of from 8 to 18 carbon atoms, may be directly added to the sulpholanyl compound, preferably with mixing, to insure the formation of a mixture of uniform composition.

The invention may be illustrated by the following examples wherein the parts are parts by weight.

*Example I*

About 0.1% by weight of triamylamine was added to a quantity of 2,4-dimethylsulpholane (2,4-dimethylcyclotetramethylene sulphone) which had been freshly prepared and was water-white in color. The mixture was stored at room temperature. It remained clear and water-white after a storage period of more than 70 days.

*Example II*

2,4-dimethylsulpholane is stabilized against discoloration by adding about 0.1% by weight of dodecylamine, based on the weight of sulpholane, to a quantity of sulpholane which has been freshly distilled at reduced pressure and is water-white in color.

*Example III*

A dark-colored sample of 2,4-dimethylsulpholane when treated with triamylamine becomes light yellow in color and does not darken upon standing.

*Example IV*

2,4-dimethylsulpholane is stabilized against discoloration by the addition of from about 0.1% to about 5.0% of anhydrous ammonia.

In a manner similar to that described in Example I for the stabilization of 2,4-dimethylsulpholane with triamylamine, 2-methyl sulpholane, 3 - methyl sulpholane, 2,3 - dimethylsulpholane, 3,4-dimethylsulpholane, 2-ethyl sulpholane, and 2 - ethyl - 3 - methyl sulpholane are stabilized against discoloration by the addition of about 0.1% of triamylamine.

We claim as our invention:

1. A method for the stabilization of 2,4-dimethylsulpholane which comprises adding thereto about 0.1% by weight of a stabilizing agent comprising triamylamine.

2. A method of stabilizing 2,4-dimethylsulpholane which comprises adding thereto from about 0.001% to about 5.0% by weight of triamylamine.

3. A process for stabilizing 2,4-dimethylsulpholane which comprises mixing with the said sulpholane a stabilizing amount of triamylamine.

4. A method for stabilizing 2,4-dimethylsulpholane which process comprises adding thereto a stabilizing amount of an aliphatic amine of from 8–18 carbon atoms.

5. A process for the stabilization of an alkyl substituted sulpholane which comprises forming a mixture of the said sulpholane and a stabilizing agent comprising triamylamine.

6. A method for the stabilization of a mixture containing at least one methyl substituted sulpholane which comprises adding thereto an amount of an aliphatic amine of 8–18 carbon atoms sufficient to stabilize the sulpholane present in said mixture.

7. A method for the stabilization of a mixture containing at least one alkyl substituted sulpholane which comprises adding thereto an amount of an aliphatic amine of 8–18 carbon atoms sufficient to stabilize the sulpholane present in said mixture.

8. A method of stabilizing a mixture comprising at least one alkyl substituted sulpholane which comprises adding thereto an amount of ammonia sufficient to stabilize the sulpholane present in said mixture.

9. A method of stabilizing a mixture comprising at least one methyl substituted sulpholane which comprises adding thereto an amount of a compound of the general formula $R_3N$ wherein R is a member of the group consisting of hydrogen and a hydrocarbon radical sufficient to stabilize the sulpholane present in said mixture.

10. A method of stabilizing a mixture comprising at least one alkyl substituted sulpholane which comprises adding thereto an amount of a compound of the general formula $R_3N$ wherein R is a member of the group consisting of hydrogen and a hydrocarbon radical sufficient to stabilize the sulpholane present in said mixture.

11. A composition of matter which comprises 2,4-dimethylsulpholane and about 0.1% by weight of triamylamine.

12. A composition comprising 2,4-dimethylsulpholane and from about 0.001% to about 5.0% by weight of triamylamine.

13. A composition comprising 2,4-dimethylsulpholane and a stabilizing amount of triamylamine.

14. A composition of matter comprising 2,4-dimethylsulpholane and a stabilizing amount of an aliphatic amine which contains from 8–18 carbon atoms.

15. A composition of matter which comprises at least one alkyl substituted sulpholane and a stabilizing amount of triamylamine.

16. A composition of matter which comprises an alkyl substituted sulpholane together with a stabilizing amount of an aliphatic amine of 8–18 carbon atoms.

17. As a composition of matter a mixture containing an alkyl substituted sulpholane and an amount of ammonia sufficient to stabilize the sulpholane present in said mixture.

18. As a composition of matter a mixture comprising at least one methyl substituted sulpholane and an amount of a compound having the general formula $R_3N$ wherein R is a member of the group consisting of hydrogen and a hydrocarbon radical sufficient to stabilize the sulpholane present in said mixture.

19. As a composition of matter a mixture comprising at least one alkyl substituted sulpholane and an amount of a compound having the general formula $R_3N$ wherein R is a member of the group consisting of hydrogen and a hydrocarbon radical sufficient to stabilize the sulpholane present in said mixture.

20. A process for stabilizing 2,4-dimethylsulpholane which comprises mixing with the said sulpholane a stabilizing amount of dodecylamine.

RUPERT C. MORRIS.
ALVA V. SNIDER.